(12) United States Patent
Anderson (10) Patent No.: US 7,006,446 B1
(45) Date of Patent: Feb. 28, 2006

(54) DETECTION OF DUPLICATE PARTICIPANTS IN A TWO-WAY MODEM ENVIRONMENT

(75) Inventor: Steven E. Anderson, La Jolla, CA (US)

(73) Assignee: General Instrument Corporation, Horsham, PA (US)

(*) Notice: Subject to any disclaimer, the term of this patent is extended or adjusted under 35 U.S.C. 154(b) by 0 days.

(21) Appl. No.: 09/889,540

(22) PCT Filed: Jan. 14, 2000

(86) PCT No.: PCT/US00/01021

§ 371 (c)(1),
(2), (4) Date: Jul. 18, 2001

(87) PCT Pub. No.: WO00/44174

PCT Pub. Date: Jul. 27, 2000

Related U.S. Application Data (60) Provisional application No. 60/116,731, filed on Jan. 22, 1999.

(51) Int. Cl.
*H04J 1/16* (2006.01)
*H04N 5/225* (2006.01)

(52) U.S. Cl. .................. 370/248; 455/10; 348/180
(58) Field of Classification Search .......... 370/248, 370/247, 251, 252; 455/411; 348/180, 192
See application file for complete search history.

(56) References Cited

U.S. PATENT DOCUMENTS

| | | | |
|---|---|---|---|
| 4,688,249 A | 8/1987 | Hayes et al. | |
| 4,829,589 A | 5/1989 | Uekusa | |
| 4,860,352 A | 8/1989 | Laurance et al. | |
| 5,335,265 A | 8/1994 | Cooper et al. | |
| 5,345,504 A | 9/1994 | West | |
| 5,455,561 A * | 10/1995 | Brown | 348/155 |
| 5,467,382 A * | 11/1995 | Schorman | 455/410 |
| 5,473,361 A | 12/1995 | Penney | |
| 5,567,933 A * | 10/1996 | Robinson et al. | 356/73.1 |
| 5,606,604 A | 2/1997 | Rosenblatt et al. | |
| 5,621,793 A | 4/1997 | Bednarek et al. | |

(Continued)

OTHER PUBLICATIONS

S. Medvinsky and S. Anderson, "DOCSIS Security vs. Cable Modem Cloning," SCTE Conference on Emerging Technologies 2000, Anaheim, Calif., Jan. 11-13, 2000.

(Continued)

*Primary Examiner*—Andy Lee
(74) *Attorney, Agent, or Firm*—Robert P. Marley (57) ABSTRACT

Duplicate participants (e.g., cloned subscriber units) (274) are detected in a communication network, such as a hybrid fiber/coax (HFC) cable television network or the like, by monitoring the physical layer of the network to detect transmission differences between such units. The subscriber units (14, 16, 18, 274, 276) may be cable modems that transmit upstream signals with associated identifiers to a headend (10, 200), e.g., to access the Internet or for telephony. Measured characteristics of the upstream signals can include: (1) propagation time (235), (2) frequency (240), (3) power (245), and (4) spectral characteristics (250). For propagation time, the reception time of the upstream message can be compared to a headend clock (215) and also to other messages with the same modem ID. For spectral characteristics, adjustment coefficients can be provided to the units to normalize the spectrum of the upstream signal to a baseline spectrum. When discrepancies are detected for an upstream signal that indicate duplicate modems are operating in the network, the account of the corresponding unit can be terminated.

25 Claims, 5 Drawing Sheets

U.S. PATENT DOCUMENTS

| | | | |
|---|---|---|---|
| 5,652,668 A | * | 7/1997 | Aulet et al. .................... 398/23 |
| 5,757,916 A | | 5/1998 | MacDoran et al. |
| 5,790,074 A | | 8/1998 | Rangedahl et al. |
| 5,838,231 A | * | 11/1998 | Scherbarth .................. 340/538 |
| 5,870,672 A | * | 2/1999 | Stoddard et al. ............ 455/410 |
| 5,978,019 A | * | 11/1999 | Copeland .................... 348/192 |
| 6,049,695 A | * | 4/2000 | Cottam ....................... 725/151 |
| 6,161,006 A | * | 12/2000 | Balachandran .............. 455/410 |
| 6,829,227 B1 | * | 12/2004 | Pitt et al. .................... 370/462 |

OTHER PUBLICATIONS

Eldering, C.A., et al., "CATV Return Path Characterization For Reliable Communications," IEEE Communications Magazine, vol. 33, No. 8, Aug. 1, 1995, pp. 62-69.

* cited by examiner

DETECTION OF DUPLICATE PARTICIPANTS IN A TWO-WAY MODEM ENVIRONMENT

This application claims the benefit of U.S. Provisional Application No. 60/116,731, filed Jan. 22, 1999.

BACKGROUND OF THE INVENTION

The following acronyms are used:
CM—Cable Modem;
CMTS—Cable Modem Termination System;
CPE—Customer Premises Equipment;
HFC—Hybrid Fiber/Coax;
ID—Identifier;
IP—Internet Protocol; and
MAC—Medium Access Control.

The present invention relates to subscriber networks, such as HFC cable television networks, and more particularly to controlling access to services provided over the network. The invention is particularly suitable for use with networks with subscriber terminals/set-top boxes that use two-way modems, such as CMs, that are connected to the network.

Such modems are increasingly being used to allow network users to send and receive data, such as from the Internet data, at relatively high speeds. The modems may also provide telephony capabilities. The invention also is useful generally for terminals that have any upstream signaling capability via the network, e.g., to a network headend.

It is important for a network operator to control access to services that are delivered via the network. However, there is a tradeoff between the level and cost of security distributed throughout any communications network. The extremes of this tradeoff are:

(a) place all of the security within the CPE (such as in a user's home), in which case, for example, only physical security associated with encryption keys is provided; and (b) place all of the security in the network, e.g., implement network security protocols that rely on the trust associated with the absolute identity, in this case physical location, of the distributed elements of the network.

For the latter case, if duplicate CPE could be identified with absolute certainty, security protocols and procedures can be implemented that relied on this trust. For purposes of this disclosure, the terms "consumer premises equipment", "subscriber unit", "terminal", "set-top box", "cable modem" and the like are used interchangeably.

Unauthorized persons ("pirates" or "attackers") have been successful in gaining access to networks using various attack techniques. One possible attack on a network of the type described above is to move the permanent identity of a first subscriber unit (e.g., a CM or other CPE), for which a subscriber has paid for the services provided by the network, to a second "clone" subscriber unit in the network. The first subscriber unit is known as the "clone master." This cloning can be performed if the security information or unit ID of the first subscriber unit is not protected from theft. Such cloning allows a single individual to purchase programming or other data services legitimately from the network, and then sell to others for a profit, without authorization, the ability (along with possibly modified terminals) to access the services.

An alternative motivation is the theft of the identity of a unit, then selling that identity to persons wishing to illegally use other network services and not pay. For example, current networks users who pay for a basic level of services can obtain enhanced services without paying. The network operator can incur significant revenue losses if the identity of the compromised unit were used, for example, to access long distance telephone services or gain free unlimited Internet access, e.g., via a CM.

To remain undetected in the network, the cloned unit must possess all of the characteristics of the clone master. If the clone is identical to the clone master, the clone will merely use the bandwidth and ID of the clone master. Moreover, if a clone unit has multiple (N) clone IDs, any of these identities can be used to gain access to the network. A concentration ratio of N:1 allows the cloned units to operate in the network with little chance of collision, if N is large enough.

The cloned units can continue to operate undetected if the network operator (e.g., the CMTS and associated servers operated by or for the service provider) does not detect any noticeable anomalies in the network's traffic, such as multiple IP addresses, increased traffic flows, etc. Additionally, the clones can continue to operate undetected even though the network operator verifies the identity of the unit that sends an upstream message. This is achieved because the verification of an ID of the subscriber unit (e.g., a CM or other CPE) is performed before the modem is registered with the network. The ID may specify a manufacturer's serial number, IEEE MAC address, and so forth. However, there is no practical method for any network operator to associate this address to a specific modem prior to modem registration.

A cloned network element will remain undetected as long as there are no discernable differences between any of the master and cloned units, and they operate within the network in a logical and physically possible manner.

For example, one method for detecting cloned analog cell phones is to identify telephone calls that originate from physically distant parts of the network within a short time window. However, such methods of clone detection are marginally effective at identifying cloned phones since unauthorized calls within the same general vicinity (e.g., same city) as unauthorized calls cannot be flagged. Additionally, data indicating the location, such as which network cell is used, must be communicated upstream to a central processing facility. Moreover, this technique is not easily used in a subscriber network such as an HFC cable television network since there is no provision to identify the network path (e.g., branch or hub) that is traveled by an upstream message from a clone terminal.

Accordingly, it would be advantageous to provide a reliable system for detecting cloned units, such as CMs, in a network. The system should be implementable with relatively low cost and complexity, and without significant disruptions in service. The system should recognize and take advantage of the fact that systems which support CM service or telephony service (e.g., HFC cable television and the like) allow several unique aspects of the physical layer to be exploited, such that subscriber units (e.g., modems) can be uniquely identified even if the unique ID can be cloned into other units.

The system should be compatible with the "Data Over Cable Service Interface Specification RF Interface" (DOCSIS RFI) standard.

The present invention provides a system having the above and other advantages.

SUMMARY OF THE INVENTION

The present invention provides for the detection of duplicate participants in a network having a terminal population with two-way communication capabilities by analyzing transmission differences in the physical layer of the network.

The physical layer is concerned with transmitting raw bits over a communication channel. Examples of physical layer attributes that can be used in accordance with the invention to identify a subscriber unit are unit timing offset, unit frequency offset, unit power offset, and unit spectral characteristics.

The pirate unit can continue to operate as a clone of a clone master in the network if it remains undetected. The invention determines that a cloned ID is being used by detecting differences in any detectable characteristics of the cloned subscriber unit that distinguish it from other cloned subscriber units (of the same ID) or from the cloned master.

Since the cloned units' transmissions do not all take the same upstream path in the network to the CMTS, differences in these paths present an opportunity for detecting piracy by uniquely identifying units that attempt to appear identical to the CMTS and the network. Thus, differences in the return path can be used in accordance with the invention to "tag" each unit uniquely. This approach not only relies on the assumed differences in path length, but it also relies on each of the clone modems not knowing the exact details of the corrections (adjustments) sent to the clone master.

A particular method for detecting a clone subscriber unit in a communication network, includes the step of recording a transmission characteristic of an original subscriber unit authorized for use in the network. The recorded transmission characteristic is compared to a comparable transmission characteristic of a subscriber unit on the network alleging to be the original subscriber unit. For example, the alleging unit may have the same ID in its upstream messages as the authorized unit. A difference between the compared transmission characteristics indicates that the alleging subscriber unit is a clone subscriber unit.

The observed transmission characteristic may include: (1) propagation time, (2) frequency, (3) power, and (4) spectral characteristics. For propagation time, an enhancement involves providing data for adjusting the assigned transmit time a subscriber unit at a lower resolution than the resolution at which the offset is initially determined. In this manner, even if the clone subscriber unit intercepts the offset and attempts to adjust its own transmit time accordingly, the CMTS can still detect when the transmit time offset is out of the expected range.

The enhancement can be extended to the other characteristics.

A corresponding apparatus is also presented.

BRIEF DESCRIPTION OF THE DRAWINGS

FIG. 3(*a*) illustrates the calculation of a signal propagation time before ranging in accordance with the present invention.

FIG. 3(*b*) illustrates a ranging region in accordance with the present invention.

FIG. 3(*c*) illustrates assigned upstream transmission slots after ranging in accordance with the present invention.

FIG. 3(*d*) illustrates an uncertainty region for signal propagation time in accordance with the present invention.

DETAILED DESCRIPTION OF THE INVENTION

Figure 1:
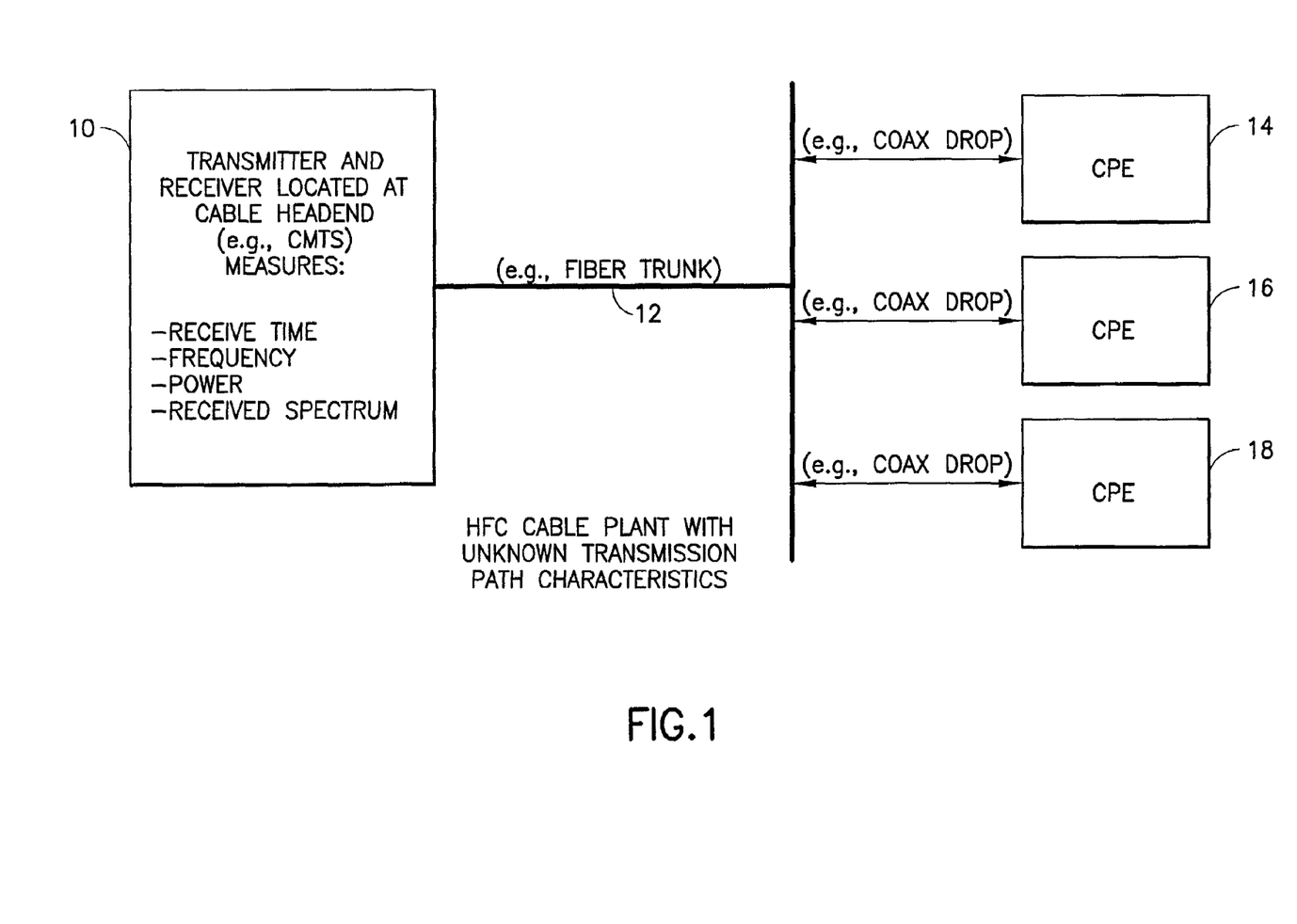
FIG. 1 is a block diagram of an HFC network embodying the present invention.

FIG. 1 illustrates, in block diagram form, an HFC cable television plant in which the invention can be implemented. Although an HFC cable television plant is illustrated for purposes of the present disclosure, it should be appreciated that the invention can be used in other network types where the possibility of cloned CPE is a concern. A transmitter and receiver located at a cable headend 10 (i.e., service provider equipment such as a CMTS) measure one or more transmission characteristics of subscriber units 14, 16, 18 (CPE) that communicate with the headend via the network 12. Any number of subscriber units can be provided, up to the network capacity, and each can be monitored by the headend.

Figure 2:
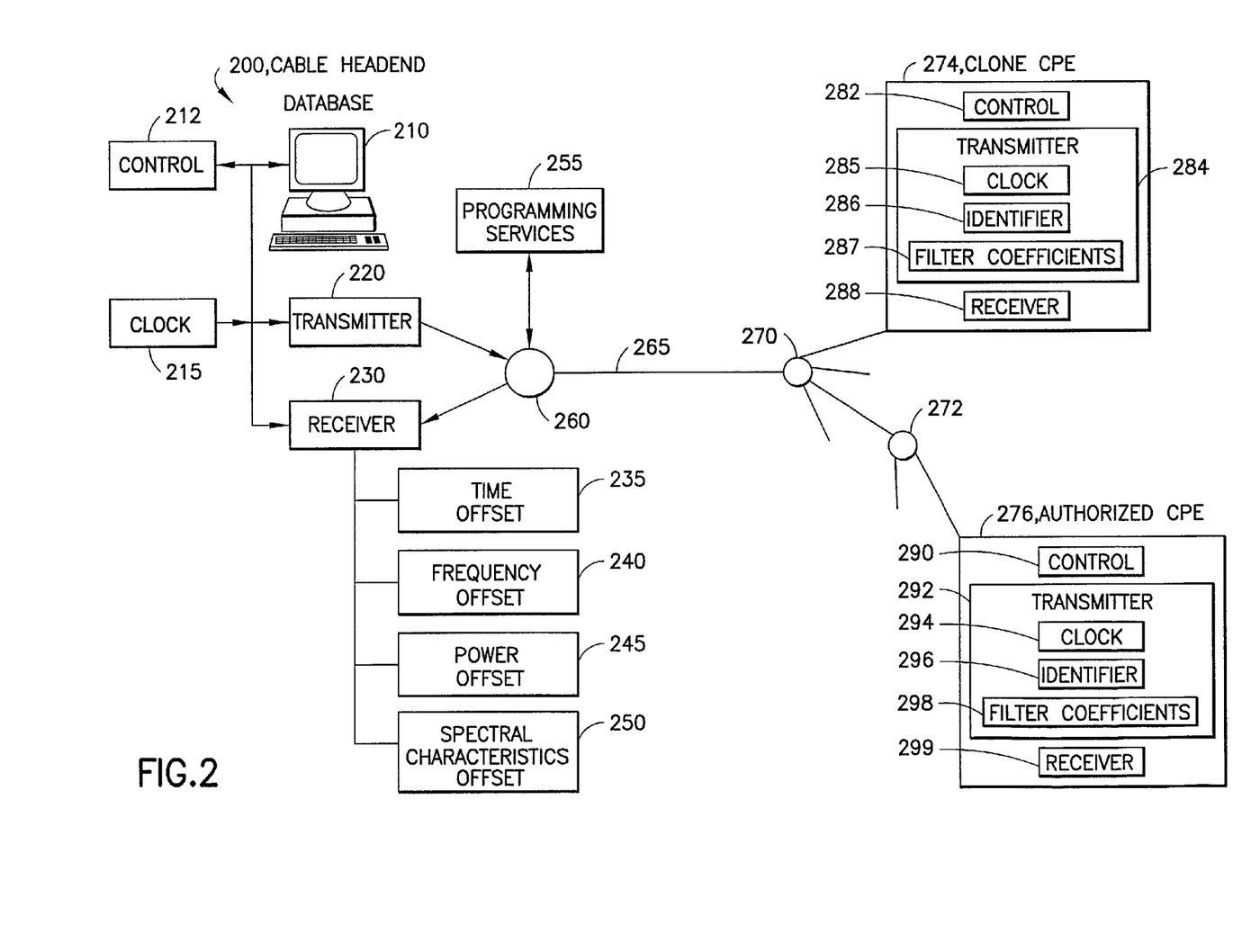
FIG. 2 illustrates a headend, authorized customer premises equipment (CPE), and clone CPE in a subscriber network in accordance with the present invention.

FIG. 2 illustrates a headend 200, authorized customer premises equipment (CPE) 276, and clone CPE 274 in a subscriber network. The cable headend 200 includes a control 212, clock 215, database 210, transmitter 220, receiver 230, and a programming services function 255. The programming services function 255 may provide television programs on the network, for example. The receiver 230 is associated with a time offset function 235, a frequency offset function 240, a power offset function 245, and a spectral characteristics offset function 250. The control 212 provides overall management of the functions at the headend 200.

The transmitter 220 transmits data via a hub 260, a network link 265, and example hubs 270 and 272 to an authorized CPE (i.e., a master unit). The transmitter transmits data via the example hubs 270 to an example clone CPE 274. Any number of clone units may be present in a network.

The clone CPE 274 includes a control 282, a transmitter 284, and a receiver 288. The transmitter 284 further includes a clock 285, an identifier (ID) function 286, and a filter with filter coefficients 287. Similarly, the authorized CPE 276 includes a control 290, a transmitter 292 (with a clock 294, an ID function 296, and a filter with filter coefficients 296), and a receiver 299.

Each of the CPE units 274, 276 can send upstream signals to, and receive signals from, the headend (or CMTS) 200. For example, if the units are CMs, the upstream signals can be for accessing the Internet, general IP-based media services or placing telephone calls. Commonly, a television, PC or other output devices are associated with each CPE unit. The data transmitted to the units 274, 276 includes data related to the service being used, along with data from the headend 200 for assigning time slots for the units to transmit upstream according to their respective bandwidth needs.

In accordance with the invention, transmission characteristics of the upstream signals are measured by the headend 200 to detect clones. These characteristics can include one or more of: (1) propagation time, (2) frequency, (3) power, and (4) spectral characteristics. Each of these is described in greater detail below.

1. In a first clone detection technique, propagation/receive time of upstream signals from the units is measured.

Generally, the ability to physically locate a subscriber unit within a network is a key factor in eliminating a timing offset attack. If the pirate can spoof the system into believing that the CPE is located in another physical location in the network, there is very little the network operator can do to locate the clone or pirate unit. This is especially true if the pirate unit is transmitting from a virtual location in the network that, to the headend, appears to be the same location as the legitimate modem.

The "Data Over Cable Service Interface Specification RF Interface" (DOCSIS RFI) specification available at www-.cablemodem.com defines a network wide timestamp that is broadcast to all units which are part of the network domain. For this discussion a "domain" and a "CMTS broadcasting on a single downstream channel" are considered to be the same. The DOCSIS specification defines a periodically-transmitted message that contains a 32-bit timestamp. The least significant bit (LSB) of this timestamp is in units of 6.25 µsec/64 and is based upon a 10.24 MHz clock. The CPE modem uses this timestamp to: 1) synchronize an internal reference clock, and 2) define an exact (to within some small guard time) time to transmit on the upstream channel.

Since all of the subscriber units (e.g., 274 and 276) in the network are not the same distance from the receiver 230 in the CMTS 200, the burst arrival times of the individual subscriber units are normalized to make all of the modems appear the same virtual distance from the headend. The DOCSIS system achieves this by a process called "ranging."

Figure 3A:
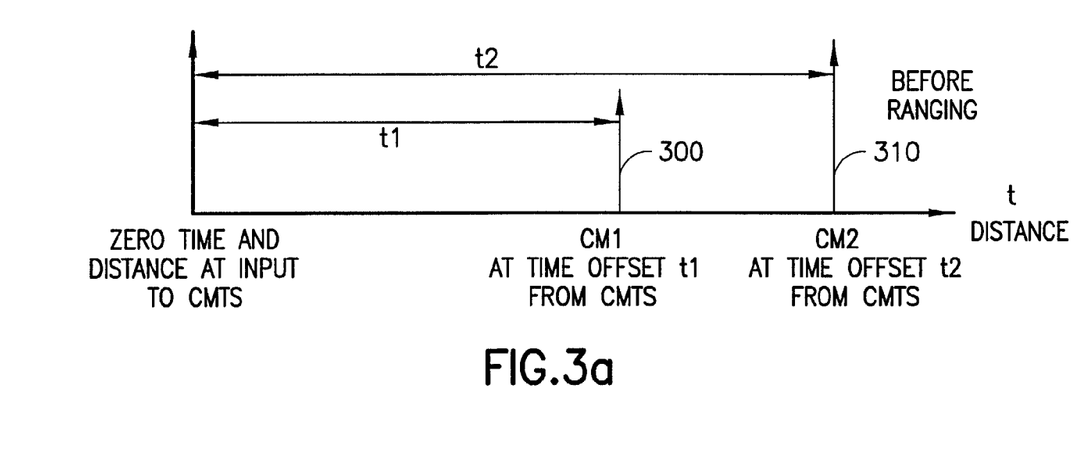

FIG. 3(a) illustrates the calculation of a signal propagation time before ranging in accordance with the present invention. A time offset t1 (300) from a first cable modem, CM1, is the measured propagation time for a signal to travel from CM1 to the CMTS, and corresponds to the physical propagation distance. Similarly, a time offset t2 (310) from a second cable modem, CM2, is the measured propagation time for a signal to travel from CM2 to the CMTS.

Figure 3B:
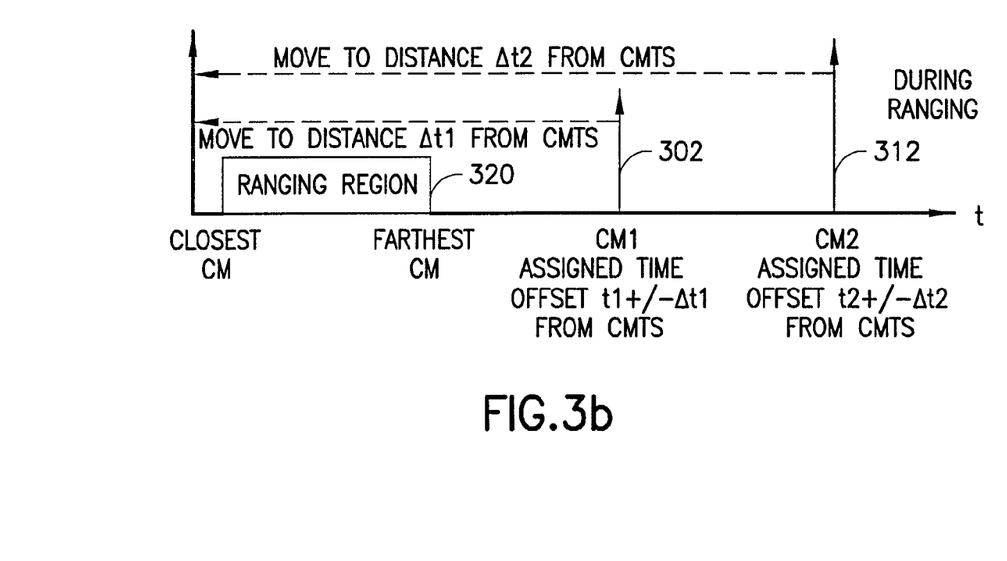

FIG. 3(b) illustrates a ranging region in accordance with the present invention. Here, a ranging region 320 is defined for all of the CMs in the network, from the CM that is closest to the CMTS, to the CM that is farthest from the CMTS. Additionally, the CM1 has a time offset 302 for transmitting messages at t1±Δt1, where Δt1 is an uncertainty due to the clock rate used at the headend. Similarly, CM2 has a time offset 312 for transmitting messages at t2±Δt2, where Δt2 is the corresponding uncertainty.

Referring also to FIG. 2, the ranging region 320 defined within the upstream bandwidth assignment is wide enough to accommodate the closest and farthest CPE from the CMTS receiver 230. The CMTS receiver 230 measures the arrival time of the ranging burst (the burst defined to occur within this region), and determines the propagation time based on a difference between the local time, as determined by the clock 215, and an assigned upstream transmission time based on the clocks 285, 294. Clocks 285, 294 are synchronized to clock 215 via the system timestamp. The time offset is determined by a time offset function 235. The differences are then sent as a timing offset to the CPEs 274, 276 in a ranging response message and used as adjustment factors for the modem upstream transmission times.

The effect of this process is that all of the subscriber units appear to be the same virtual distance from the CMTS receiver. They actually look like they are at a zero physical distance from the CMTS upstream receiver, since the time indicated by the corrected time stamp matches the local time at the CMTS 200. Thus, the CMTS receiver knows the absolute propagation time and transmission path length of every CPE on the network within that domain. The resolution of this measurement (worst case) is approximately 100 feet, assuming a 10.24 MHz sampling clock at the CMTS receiver and using the propagation constant of electromagnetic radiation in free space (i.e., $3 \times 10^8$ m/sec/$10.24 \times 10^6$ Hz/0.3048 m/ft=95.8 ft).

The propagation constants for coax cable and optical fiber are approximately 88% and 69%, respectively, of that for free space. The ratio of coax to fiber is generally known by the plant manager, but will vary greatly in different networks. Since it is not feasible to determine the exact ratio of coax to fiber in any single plant, the free space propagation constant can be used as the worst case. In addition, if the sampling rate is doubled (20.48 MHz), a worst case resolution of approximately 50 feet is achieved. Other changes in the sampling rate will affect the resolution accordingly.

Figure 3C:
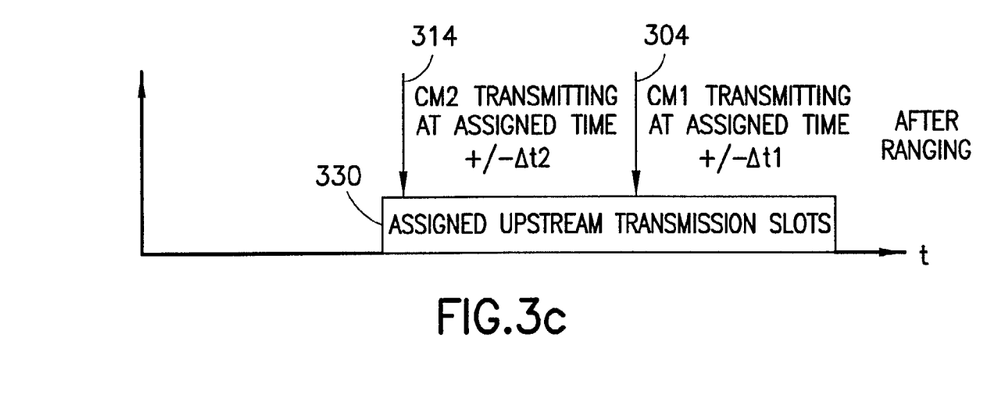

FIG. 3(c) illustrates assigned upstream transmission slots after ranging in accordance with the present invention. The assigned upstream transmission slots 330 show CM1 and CM2 transmitting at the assigned times, 304 and 314, respectively, with the associated uncertainties.

Figure 3D:
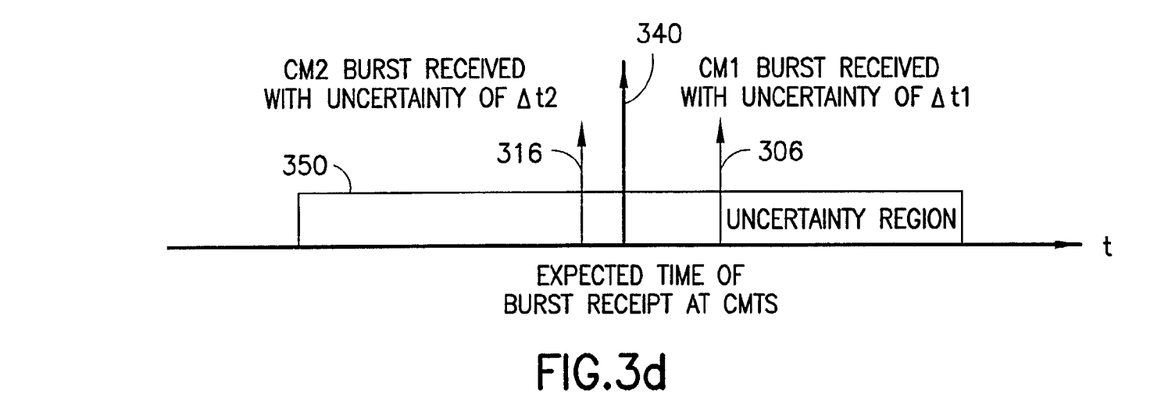

FIG. 3(d) illustrates an uncertainty region for signal propagation time in accordance with the present invention. The uncertainty region 350 accounts for the uncertainties of all subscriber units (CMs) in the network, which can amount to hundreds or thousands of units. The uncertainty region width represents the worst case uncertainty based on the measurement resolution of the burst in the headend and the value of the LSB in the ranging offset sent to the CMs.

The CM1 burst 306 and CM2 burst 316 are shown as being offset from the expected receive time 340 by the corresponding uncertainties.

The ability to determine the subscriber unit distance from a known location such as a headend, and the resolution of this determination, depends primarily on the implementation of the service provider's return path receiver 230 that receives communications back from the subscriber units.

Thus, in accordance with the invention, a clone subscriber unit can be detected by measuring the propagation time of each upstream message having a given unit ID.

If the network operator determines that two different propagation times are detected from the receipt of upstream transmissions with the same ID, it can be concluded that at least one of the units is a clone. The operator can then take appropriate steps, such as terminating the account of any unit using that ID.

Accordingly, the invention allows the network operator to determine that multiple subscriber units having the same identity are present in the network. It is also possible to detect the movement of a single subscriber unit within the network.

With respect to propagation time differences, as mentioned above, the CMTS (or a comparable service provider apparatus) normalizes all of the subscriber units to appear as if they were at a zero distance from the CMTS even though they are physically located at different distances from the CMTS.

However, the above method of intrusion detection may conceivably be defeated if one could spoof the system into believing that client (subscriber) units located at different distances from the CMTS receiver were really located at the same distance from the CMTS receiver. In this case, the time offset check at the CMTS would no longer reveal cloned units. For example, assume CM1 is the clone master which has a valid network subscription, and CM2 is a clone of that modem. Note that there is additional out-of-band coordination required between clone master CMs and cloned CMs for DOCSIS transmission assignments and power control.

A clone first performs ranging as described in the previous section. However, the clone does not use its own MAC address during the initial ranging process. Instead, it uses a MAC address of some other valid CM, or possibly even some random MAC address, if the CMTS will accept it.

After this initial ranging, the clone will know its time offset from the CMTS, i.e., t2. The intrusion detection technique described earlier will not catch this clone, because it is not using its MAC address. In fact, if the clone uses a MAC address of another valid CM, an attempt at the intrusion detection could result in de-authorization of a valid CM, i.e., a denial of service attack.

After this initial ranging, the clone ranges again with the cloned MAC address. The steps are as follows:

1) CM2 (the cable modem clone) performs initial ranging using a random but valid MAC address to obtain its ranging offset, t2, from the CMTS (as illustrated earlier).

2) CM2, which has the identity (including the MAC address) of the clone master, listens for the clone master initial ranging information. Based on detecting ("snooping") the initial ranging response from the CMTS to the clone master (or through some out-of-band method), CM2 now knows the value of t1.

3) CM2 then calculates the difference between its time offset (t2) and the clone master's time offset (t1).

4) CM2 can now perform subsequent initial ranging using the clone master ID and appear to the CMTS as if it was at the same location as CM1 (the clone master). CM2 can do this by sending a ranging request t2−t1 seconds earlier than it is supposed to.

5) CM2 can now monitor ("sniff") the downstream to note any use of CM1 (or through out-of-band methods) and, if clear, CM2 can request upstream transmission slots using CM1's identity.

6) The headend sees the transmission in the correct assignment with the correct time offset and cannot tell the difference without more a sophisticated transmission arrival time detection scheme.

An advantage of this method for the attacker is that the CMTS only sees one transient ranging request with an ID that is not subscribed. All subsequent initial ranging will be performed by one of the cloned modems that are using the clone master's identity.

The intrusion detection techniques described herein can be enhanced to detect these more sophisticated attacks by increasing the frequency of the sampling clock at the CMTS (or other comparable service provider apparatus) such that a resolution of greater than, e.g., 100 feet is obtained. This provide additional ranging resolution, which may allow additional cloned units to be detected.

Another enhancement is to decrease the number of bits sent to each CPE in the ranging response time offset message, but continue to measure with the current resolution. If, for example, the granularity of the LSB is increased (e.g., by truncating the last three LSBs) the measuring resolution increases to 800 feet. The sampling frequency remains the same so the measurement resolution is still 100 feet. This technique has the effect of increasing the uncertainty of the transmission time, based upon the physical location of the modem from the cable headend CMTS and, therefore, the likelihood that duplicate CMs can be detected. This method has the disadvantage that bandwidth is sacrificed.

Alternatively, these same LSBs could be randomized and sent to each of the cloned modems. This has the additional advantage of not providing any indication to the attackers that any intrusion techniques are enabled. The uncertainty of these measurements is shown in FIG. 3(d).

2. In a second clone detection technique, frequency differences in the upstream signals from the subscriber units are used to distinguish cloned CPE units. In particular, each CPE 274, 276, transmits on an assigned center frequency. The service provider (e.g., CMTS 200) receives the transmitted signal by matching this signal's frequency and extracting the information contained in the signal. Differences in the exact received frequency can be measured by the frequency detector 240 at the CMTS 200 or other service provider equipment to detecting duplicate units.

Optionally, adjustment data can be provided to the original subscriber unit to change its center frequency.

3. In a third clone detection technique, power differences in the upstream signals from the subscriber units are used to distinguish clone units. Each CPE 274, 276 transmits at an assigned power level. The CMTS 200 (or other service provider apparatus) sends commands to each CPE to set the power level to use for the unit's upstream transmissions. However, the power of the signal from each unit is attenuated by different amounts as the signals travel upstream in the network, so the measured level at the CMTS 200 will be less than the designated transmission levels. These decreases are a result of the differences in attenuation of the signal as the signal from each CPE traverses a different path, or part of the upstream spectrum back to the CMTS 200.

The power detector 245 at the CMTS 200 monitors each transmitted burst (upstream signal) and measures the power to determine a baseline expected power level for each unit ID. Thus, a clone unit can be identified when the measured power for a given ID does not match the expected level.

Optionally, adjustment data can be provided to the original subscriber unit to change its signal's power.

4. In a fourth clone detection technique, differences in the spectral characteristics of the upstream signals from the subscriber units are used to distinguish clone units. Each unit transmits through a unique path over the cable plant back to the service provider. The paths may cause changes in the spectral characteristics of received upstream signals.

Each burst (upstream signal) received by the CMTS 200 contains a preamble such that a demodulator (spectral characteristics detector 250) at the CMTS 200 can "train" for a period of time before the actual start of the data. During this training period, the demodulator determines the spectral characteristics of the burst and attempts to equalize the burst for optimal reception. A set of unique equalization (filter) coefficients are derived as result of the preamble spectral analysis and sent to each CM. These coefficients can also be stored in the database 210 and used to uniquely define each individual unit on the assumption that each of these units traversed a physically different path.

Figure 4:
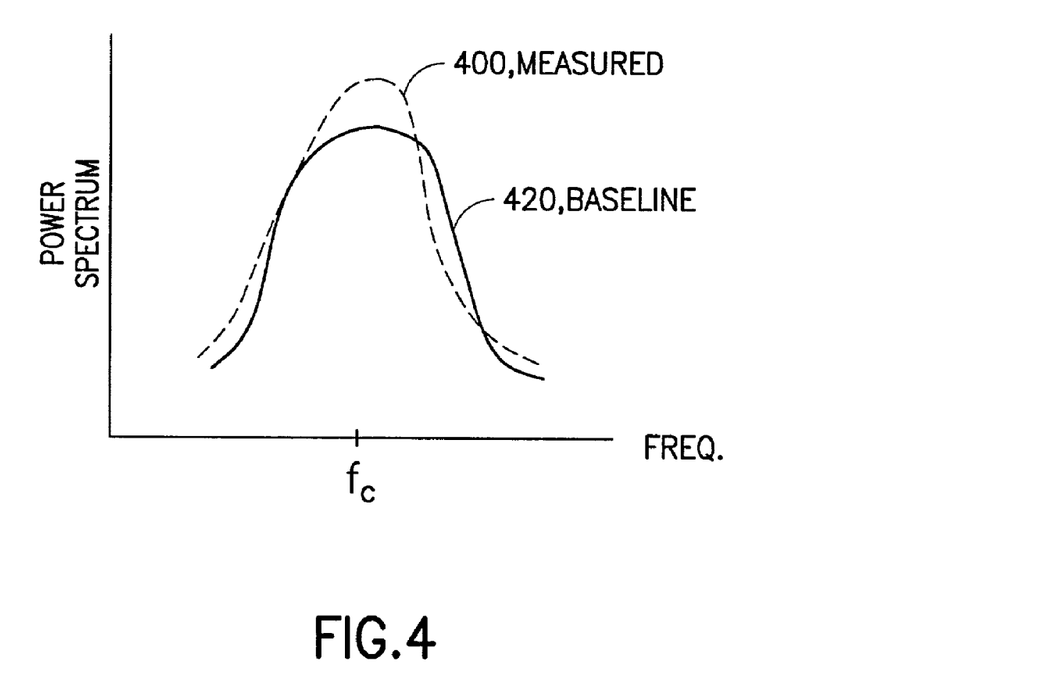
FIG. 4 illustrates measurement of the power spectrum of a received upstream signal at a headend in accordance with the present invention.

FIG. 4 illustrates measurement of the signal power spectrum of a received upstream signal at a headend. Using known frequency domain processing techniques, the power spectrum of a received signal might be measured as shown at 400 during the training period. The measured spectrum can be normalized to a baseline spectrum 420 using the equalization coefficients. Any significant deviation from the baseline 420 after the training period is an indication of a clone unit.

It should now be appreciated that the present invention provides techniques for locating duplicate participants (e.g., cloned subscriber units) in a communication network, such as an HFC cable television network or the like, by monitoring the physical layer of the network to detect transmission differences between such units. If such transmission differences are found from units that use a common ID, it is evident that a cloned unit is in use.

The measured characteristics can include one or more of: (1) propagation time, (2) frequency, (3) power, and (4)

spectral characteristics. Moreover, a combination of characteristics can be used to provide a greater certainty that a clone exists.

Furthermore, it is not necessary to monitor each characteristic for every upstream signal. For example, only one or two characteristics need be measured. Propagation time and spectral characteristics are believed to be particularly effective in detecting clones. If a discrepancy is detected for a unit ID, the ID may be flagged as a possible clone, and other characteristics may be measured to provide a more concrete determination.

Moreover, selected unit IDs may be measured if they are suspect for some reason, such as unusually high traffic from that ID.

Random or sequential measuring of the units may also be implemented.

Moreover, the invention is not limited to use with cable modems, but may be used in any network where it is possible to measure the characteristics disclosed herein, and to relate any discrepancy to a particular unit ID.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for detecting a clone subscriber unit in a communication network, comprising the steps of:
   recording a transmission characteristic of a signal from an original subscriber unit that is authorized for use in said network;
   measuring a comparable transmission characteristic of a signal from a subscriber unit on said network alleging to be said original subscriber unit; and
   determining whether there is a difference between the measured transmission characteristic and the recorded transmission characteristic;
   wherein any such difference is indicative that the alleging subscriber unit is a clone subscriber unit.

2. The method of claim 1, wherein:
   said recording, measuring and determining steps occur at a headend of the network.

3. The method of claim 1, wherein:
   the measured transmission characteristic is associated with a physical layer of said network.

4. The method of claim 1, wherein:
   said network is a hybrid fiber/coax cable television network.

5. The method of claim 4, wherein:
   said original and alleging subscriber units are cable modems.

6. The method of claim 4, wherein:
   said original and alleging subscriber units comprise hybrid fiber/coax consumer premises equipment.

7. The method of claim 1, wherein:
   the recorded transmission characteristic comprises at least one of a propagation time and a propagation time offset for the signal of the original subscriber unit.

8. The method of claim 7, wherein:
   the propagation time offset is determined by comparing an assigned propagation time of the signal of the original subscriber unit to a receive time thereof.

9. The method of claim 7, comprising the further steps of:
   providing adjustment data to adjust the propagation time offset to a desired value; and
   communicating the adjustment data to any subscriber unit in the network that uses an identifier associated with the original subscriber unit for use in adjusting a propagation time offset thereof.

10. The method of claim 9, wherein:
    the adjustment data is provided by a headend of the network.

11. The method of claim 9, comprising the further steps of:
    determining the propagation time offset by sampling the signal of the original subscriber unit using a clock having a clock rate corresponding to a first resolution; and
    providing the adjustment data at a second, coarser resolution.

12. The method of claim 11, wherein:
    the clock rate is increased from a nominal level corresponding to said second resolution for recovering upstream transmissions from subscriber units in the network, to a higher level to achieve the first resolution for determining the propagation time offset.

13. The method of claim 11, wherein:
    the clock rate operates at the first resolution for initially providing the adjustment data; and
    the adjustment data is provided at the second resolution by omitting at least one least significant bit thereof.

14. The method of claim 11, wherein:
    the clock rate operates at the first resolution for initially providing the adjustment data; and
    the adjustment data is provided at the second resolution by randomizing at least one least significant bit thereof.

15. The method of claim 1, wherein:
    the recorded transmission characteristic comprises at least one of a frequency and a frequency offset.

16. The method of claim 15, comprising the further steps of:
    providing adjustment data to adjust the frequency offset to a desired value; and
    communicating the adjustment data to any subscriber unit in the network that uses an identifier associated with the original subscriber unit for use in adjusting a frequency thereof.

17. The method of claim 1, wherein:
    the recorded transmission characteristic comprises at least one of a power and a power offset.

18. The method of claim 17, comprising the further steps of:
    providing adjustment data to adjust the power offset to a desired value; and
    communicating the adjustment data to any subscriber unit in the network that uses an identifier associated with the original subscriber unit for use in adjusting a power thereof.

19. The method of claim 1, wherein:
    the recorded transmission characteristic comprises a spectral characteristic.

20. The method of claim 19, wherein:
    the spectral characteristic comprises at least one of a power spectrum and a power spectrum offset.

21. The method of claim 20, comprising the further steps of:
    providing adjustment data to adjust the power spectrum offset to a desired value; and
    communicating the adjustment data to any subscriber unit in the network that uses an identifier associated with the original subscriber unit for use in adjusting a power spectrum thereof.

22. The method of claim 21, wherein:
the adjustment data comprises filter coefficient data.

23. The method of claim 1, wherein:
the recorded transmission characteristic is obtained from a measurement of the signal of the original subscriber unit.

24. An apparatus for detecting a clone subscriber unit in a communication network, comprising:
- means for recording a transmission characteristic of a signal from an original subscriber unit that is authorized for use in said network;
- means for measuring a comparable transmission characteristic of a signal from a subscriber unit on said network alleging to be said original subscriber unit; and
- means determining whether there is a difference between the measured transmission characteristic and the recorded transmission characteristic;
- wherein any such difference is indicative that the alleging subscriber unit is a clone subscriber unit.

25. An apparatus for detecting a clone subscriber unit in a communication network, comprising:
- means for recording a transmission characteristic of an original subscriber unit authorized for use in said network; and
- means for comparing said recorded transmission characteristic to a comparable transmission characteristic of a subscriber unit on said network alleging to be said original subscriber unit;
- wherein a difference between the compared transmission characteristics is indicative that the alleging subscriber unit is a clone subscriber unit.

* * * * *